United States Patent
Jo et al.

[11] Patent Number: 5,924,455
[45] Date of Patent: Jul. 20, 1999

[54] FOLDED PVC-BASED CONDUIT AND CONDUIT LINER COMPOSITION

[75] Inventors: Byeong H. Jo, Blue Bell; Joong Y. Kim, Newtown Square, both of Pa.

[73] Assignee: CertainTeed Corporation, Valley Forge, Pa.

[21] Appl. No.: 08/690,899

[22] Filed: Aug. 1, 1996

[51] Int. Cl.$^6$ ............................. F16L 9/00; F16L 55/165
[52] U.S. Cl. .................. 138/97; 138/98; 138/DIG. 7; 264/516; 264/269; 525/240
[58] Field of Search ................. 264/176.1, 269, 264/516; 526/344; 524/414, 400; 525/240; 138/97, 98, DIG. 7

[56] References Cited

U.S. PATENT DOCUMENTS

| | | |
|---|---|---|
| 3,867,481 | 2/1975 | Whang . |
| 4,161,472 | 7/1979 | Lehr . |
| 5,034,180 | 7/1991 | Steketee, Jr. . |
| 5,124,373 | 6/1992 | Baumgaertel et al. ............. 264/176.1 |
| 5,244,624 | 9/1993 | Steketee, Jr. . |
| 5,368,809 | 11/1994 | Steketee, Jr. . |
| 5,380,786 | 1/1995 | Greenlee et al. . |
| 5,397,513 | 3/1995 | Steketee, Jr. . |
| 5,403,120 | 4/1995 | Steketee, Jr. . |
| 5,447,665 | 9/1995 | Steketee, Jr. . |
| 5,543,449 | 8/1996 | Drewes et al. . |
| 5,641,826 | 6/1997 | Lawson et al. ...................... 264/176.1 |

FOREIGN PATENT DOCUMENTS 5-57792  3/1993  Japan .................................. 264/269

*Primary Examiner*—Mathieu D. Vargot
*Attorney, Agent, or Firm*—Duane Morris & Heckscher LLP

[57] ABSTRACT

Provided is a pipe and pipe liner composition including PVC, a PVC-hydrogen bonding modifier and a PVC-polar bonding modifier.

2 Claims, 8 Drawing Sheets

| Cell Classification (ASTM D1784) | | | | | |
|---|---|---|---|---|---|
| Base Resin | Impact Strenght | Tensile Strenght | Tensile Modulus | Deflection Temp | Chemical Resistance |

| Sample | 1 | 3 | 2-3 | 2-3 | 3 | B |
|---|---|---|---|---|---|---|
| | PVC | 1.5-5.0 FT.LB/IN | 5000->6000 psi | 280,000->320,000 psi | 140-158°F | 1-5% Weight Increase |

FIG. 8

FOLDED PVC-BASED CONDUIT AND CONDUIT LINER COMPOSITION

BACKGROUND OF THE INVENTION

This invention relates to improvements to conventional methods and apparatuses for installing replacement pipe or otherwise inserting a pipe liner composition in an existing conduit, typically in place underground, using a normally rigid thermoplastic composition as the replacement pipe or pipe liner, and more specifically to modified PVC in a collapsed, folded, flexible condition as replacement pipe or pipe liner.

Folded and collapsed thermosetting plastic replacement pipeline or conduit material is known. For example, U.S. Pat. No. 5,447,665, the entirety of which is incorporated herein by reference, describes such a product which can be installed in existing underground conduit such as sewer pipe. In this reference, a thermoplastic material, such as PVC, is extruded and cooled to a folded and flattened shape which retains a folded memory when reheated thereby facilitating spooling for storage and use and later insertion in an underground conduit. See also, U.S. Pat. No. 5,397,513, which is incorporated herein by reference, and which describes folded normally rigid thermoplastic tubular membrane which can be inserted into an underground conduit to be repaired and inflated. See also, for example, U.S. Pat. Nos. 5,403,120; 5,368,809; 5,244,624, and 5,034,180, all of which are incorporated herein by reference.

After installation, reforming and cooling, however, many rigid thermoplastic pipe/conduit liner materials, especially rigid PVC, become susceptible to cold-stress cracking most commonly around service connection orifices. An important need therefor exists for an improved thermoplastic material which is suitable for use as a folded and flattened pipe/conduit liner material and which is resistant to cold stress cracking after installation.

Further, it is also desirable to provide a thermoplastic liner material which retains softness in its folded position long enough such that it can be installed with less time restrictions than conventional material.

SUMMARY OF THE INVENTION

To fulfill the needs and desires identified above, the present invention now provides an improved PVC thermoplastic conduit liner material which, inter alia, after installation is more resistant to cold stress cracking than conventional rigid PVC material. The composition comprises a mixture of poly vinyl chloride (PVC) with one or more polymers effective to form hydrogen bonds with PVC, such as for example, ethylene-alkylacrylate copolymers (E/AA), in combination with one or more polymers effective to form polar bonds with PVC, such as chlorinated polyethylene (CPE).

The new and improved PVC-based composition provided by this invention also has a softening point low enough to be heated efficiently in the field during installation such that it retains softness for a time sufficient to allow its installation without conventional undesirable time restrictions, and that the time needed to heat and unfold the material prior to installation is reduced. The improved composition of this invention further meets rigidity and performance standards (Flexural Modulus) of ASTM F 1504, a desired tensile strength, and a chemical resistance of at least B or better in ASTM D 1784 chemical resistance classification.

The invention is more fully described by the following detailed description of preferred embodiments with reference to Figures and examples.

BRIEF DESCRIPTION OF THE DRAWINGS

FIG. 8 illustrates cell classification of various properties of the composition of FIG. 3 in accordance with ASTM D 1784.

DETAILED DESCRIPTION OF PREFERRED EMBODIMENTS

Figure 1:
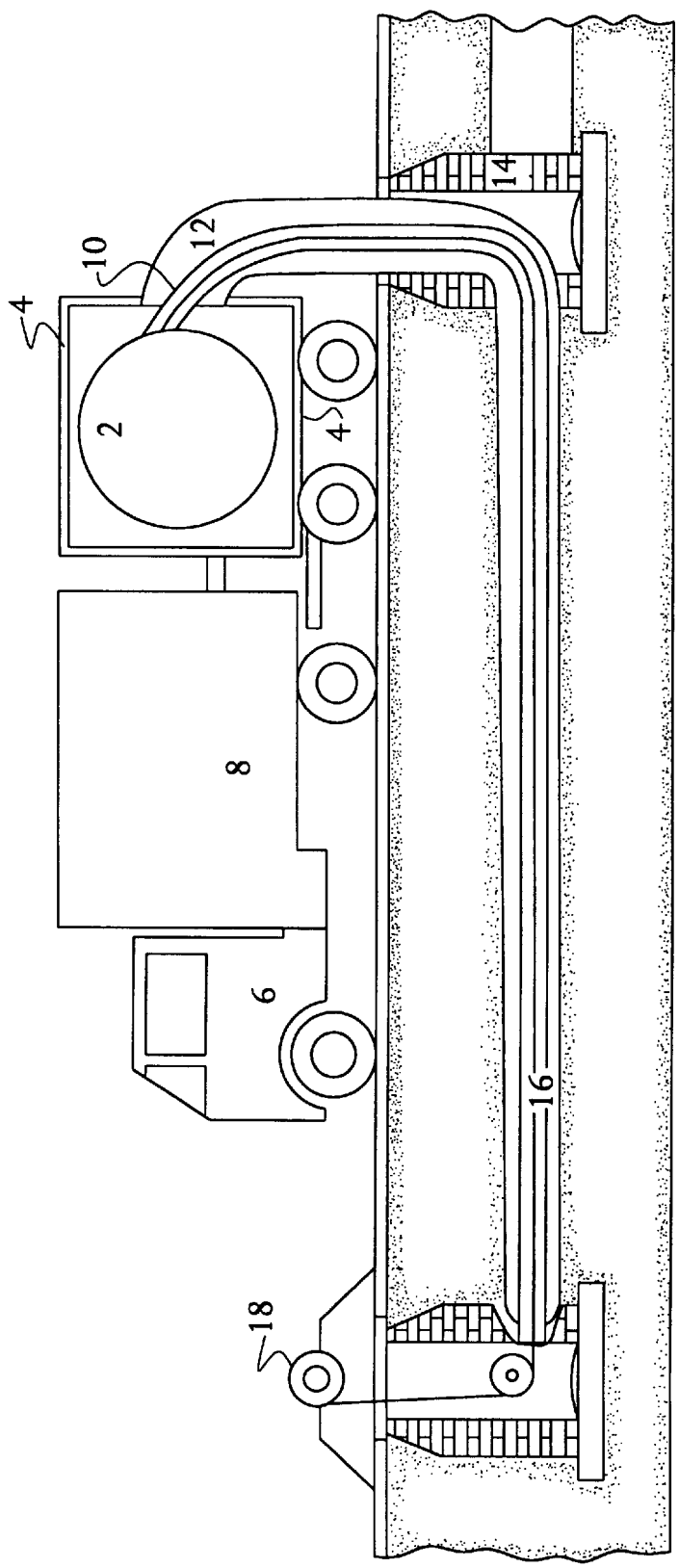
FIG. 1 is a diagram illustrating the process of installing PVC-based conduit composition of this invention in an existing conduit as a collapsed liner.

The presently inventive pipe/conduit-pipe/conduit liner composition is a mixture of PVC with one or more polymeric materials effective to form hydrogen bonds with PVC, such as for example, ethylene-acrylate copolymers, along with one or more polymers effective to form intermolecular polar bonds with PVC, such as chlorinated polyethylene (CPE).

As is known, PVC is a polymer which contains polar bonds and which is resistant to creep compared to non-polar bond-containing polymers such as polyolefins. Such high creep resistance results in cold stress cracking of PVC pipe/conduit at localized defects. Thus, to improve resistance of PVC material to cold stress cracking, stress generation caused by cooling must be reduced. In accordance with the present invention, it has been found that hydrogen bonding formation between PVC and a hydrogen bonding PVC modifier stabilizes the PVC molecular network and reduces stress caused by contraction (i.e. due to cooling). Further, in accordance with this invention polar bonding modifiers provide PVC with a low modulus, flexibility, elongation and tensile strength at around the glass transition temperature of PVC to facilitate the maintenance of PVC in a softened condition in its installation and handling and its subjection to rounding forces.

While not intending to limit the present invention to any particular theory, it is thought that the combination of PVC hydrogen bonding polymers which prevent stress cracking but which do not provide for good strength at PVC softening temperatures of about from 160–200° F. is complimented by CPE which provides for high strength at softening temperatures.

Any polymeric material effective to hydrogen bond with PVC is contemplated for use in this invention, such as ethylene-alkylacrylate copolymers (E/AA), of which some examples suitable for use herein include ethylene-methyl acrylate copolymer (E/MA), ethylene-ethyl acrylate copolymer (E/EA), and ethylene-butyl acrylate copolymer (E/BA). Some examples of other suitable PVC hydrogen-bonding polymers include polyvinyl acetate (PVA), ethylene-vinyl acetate copolymer (E/VA), ethylene-vinyl alcohol copolymer (E/VOH), various acrylic polymers and the like. Some commercially available E/AA copolymers include Poxon from Allied Corp., Zetafin from Dow Chemical, Primacor from Dow Chemical Co. and Elvaloy 441 from DuPont Chemical Co.

Some examples of polymermeric materials effective to form polar bonds with PVC and suitable for use herein include CPE and acrylonitrile-containing polymers such as ABS (acrylonitrile-butadiene-styrene) BAN copolymers (butadiene acrylonitrile) and styrene acrylonitrile copolymers.

For simplicity in illustration, an E/AA copolymer segment is shown below in hydrogen-bonding mode with a PVC segment.

Ethylene/alkylacrylate copolymer

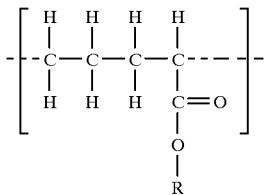

R-methyl, ethyl, propyl, butyl, etc.

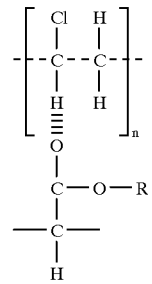

The inventive PVC based compositions can also include, inter alia, one or more heat stabilizers, such as for example, TM-697 (Morton International), internal lubricants such as for example, calcium stearate, external lubricants such as for example, paraffin wax and polyethylene wax, fillers such as calcium carbonate, pigment such as titanium dioxide, and processing aids such as K-120-ND (Rohm & Haas), and any other conventional adjuvants, extenders, additives and the like for their known purposes.

The PVC-based compositions of this invention can be prepared by any conventional polymeric compounding technique. In a typical method the components except for the modifiers are placed in a high intensive mixer and then transferred into a tumbling mixer, wherein modifiers are added and then the PVC pipe is extruded from this mixture in conventional methods. Alternatively, for example, the PVC-based composition components including, for example, CPE are added to an intensive mixer followed by a cooling mixer and silo and then conventionally extruded, at which point the hydrogen-bonding modifier can be added at any point in the extrusion process, preferably just prior to extruded material exiting an extrusion die.

The amounts of PVC hydrogen boding modifier used in conjunction with PVC polar boding modifier in compounding the PVC-based composition of this invention are not critical, as the ratio of these components can vary widely depending on, for example, the end use contemplated and the conditions under which conduit installation is conducted, and thus any amount of hydrogen boding modifier in combination with polar bonding modifier which provides the desired tensil strength PVC pipe composition with increased resistance to cold stress cracking is contemplated by this invention. However, it is preferable that the PVC hydrogen bonding modifier is present in an amount from about 2 PHR to about 6 PHR, and the polar bonding modifier is present in an amount of from about 4 PHR to about 8 PHR, based on the total weight of the PVC resin.

More preferably, the inventive PVC-based composition is compounded to designate the properties set forth below in Table 1.

TABLE 1

| | ASTM METHOD | VALUE |
|---|---|---|
| Tensile Strength | D-638 | 5500–6600 |
| Tensile Modulus | D-638 | 280,000–360,000 psi |
| Specific Gravity | D-792 | 1.30–1.36 |
| Izod Impact | D-256 | >1.50 ft. lbs/in |
| Deflection Temp (° C.) | D-648 | 63–64 |
| Thermal Expansion | E-831 | 2.7–3.2 × $10^{-5}$/° F. |
| Acid Resistance | D-543;D-790 | B |
| Oil Resistance | D-543 | A |

A typical formulation falling within the scope of the designated properties in Table 1 is set forth below in Table 2.

TABLE 2

| Ingredients | Parts By Wt. (PHR-parts per hundred parts of resin |
|---|---|
| PVC Pipe Grade Resin | 100.0 |
| Tin Heat Stabilizer | 0.8–2.5 |
| Internal Lubricant | 0.5–1.0 |
| External Lubricant | 1.0–1.5 |
| Filler | 3.0–5.0 |
| $TiO_2$ | 1.0–3.0 |
| Processing Aid | 1.0–3.0 |
| Impact Modifier (CPE) | 0.5–15 |
| Ethylene/Alkylacrylate Copolymer | 0.5–15 |

The inventive compositions can be formed into any desirably sized PVC stock which is suitable for insertion into existing conduit, and suitable for use, for example, as underground conduit in drain lines, sewer lines, water lines and the like. The conduit stock may be manufactured from the inventive PVC-based composition in a collapsed and folded shape, such as described for example, in U.S. Pat. No. 5,447,665, which can be later heated and expanded via conventional techniques, to a rounded shape after insertion into an underground conduit, and cooled and formed in place in its rounded shape. Such an embodiment is illustrated below. Alternatively, as also discussed in U.S. Pat. No. 5,447,665, the inventive PVC-based composition may be manufactured into thermoplastic conduit having a tubular or round shape of conventional dimensions as described above, which can subsequently be reshaped by flattening and folding in a suitably described apparatus. Pipe folding means and apparatus are discussed in detail in U.S. Pat. No. 5,447,665.

Turning now to FIG. 1, a preferred embodiment of installation of conduit manufactured from the inventive PVC-based composition is illustrated. A spool 2 of folded thermoplastic pipe is stored in a housing or "heat chamber" 4 ("hot box") which can be situated on a movable trucking unit 6, such as the flat bed of a truck as shown, for transportation to a job site. The heat chamber 4 is usually equipped with a thermostatically controlled heater (not shown) powered by power unit 8 for heating the interior of the heat chamber 4, and the spool 2 to provide pliable folded pipe for installation. There is also a means provided, either manual or powered, for rotating spool 2 for winding folded thermoplastic conduit on the spool or unwinding it from the spool. The heat chamber 4 is equipped with an access door 10 and, inter alia, may be equipped with a heat containment tube 12 as shown in FIG. 1. As further shown, the folded PVC-based conduit is heated until it is soft, for example, at temperatures in the range of from about 150° F. to about 210° F., and capable of being unwound from spool 12 and pulled through heat containment tube and through a manhole 14, and then inserted and pulled through an existing underground pipe or conduit 16. The heat containment tube 12 can overlap the lip of existing conduit 16 to insure heat conservation and concomitant softness and pliability of the unspooled PVC-based conduit, which can be pulled through existing conduit 16, for example, by a winch means 18 situated in a second manhole at the other end of conduit 16, as shown in FIG. 1.

Alternatively, in some instances, in accordance with the inventive composition's heat retention properties and flexular modulus, the heat containment tube can be dispensed with.

Figure 2:
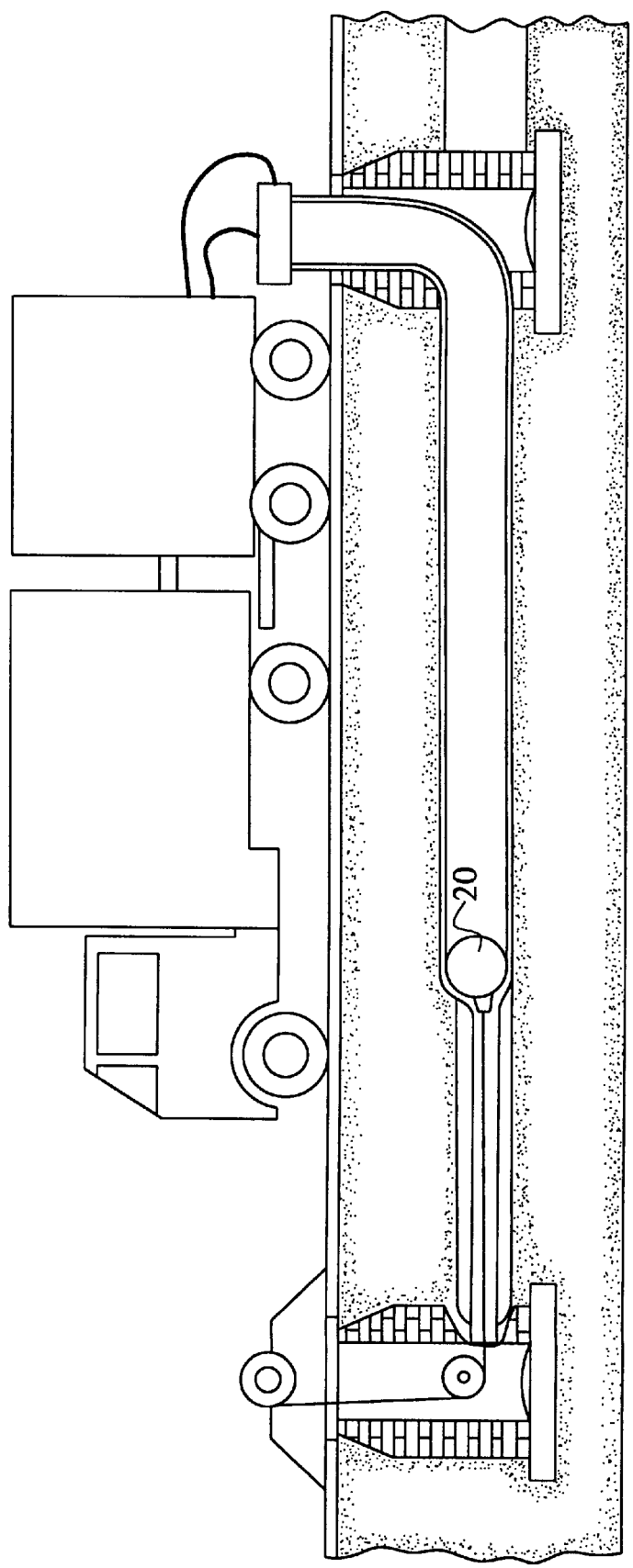
FIG. 2 is a diagram further illustrating the process of installing the conduit composition of this invention in an existing conduit, and then expanding the conduit composition.

Once installed, the PVC-based conduit can be expanded and rounded in conduit 16 by any conventional manner, such as, for example, a steam driven rounding means described in detail in U.S. Pat. No. 5,368,809, and shown in FIG. 2 herein as 20.

Figure 3:
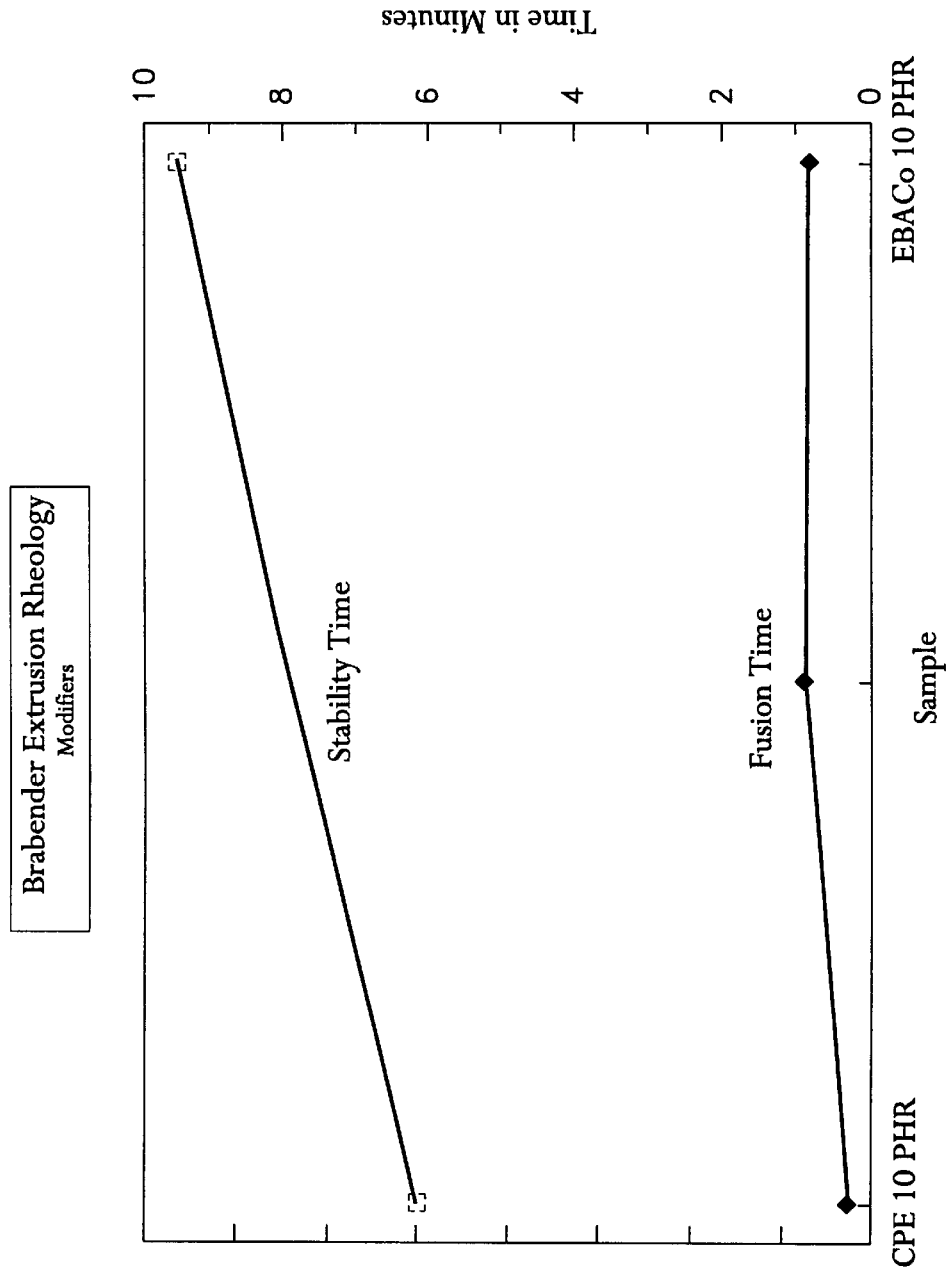
FIG. 3 graphically illustrates heat stability of a sample composition prepared in accordance with the invention.
Figure 6:
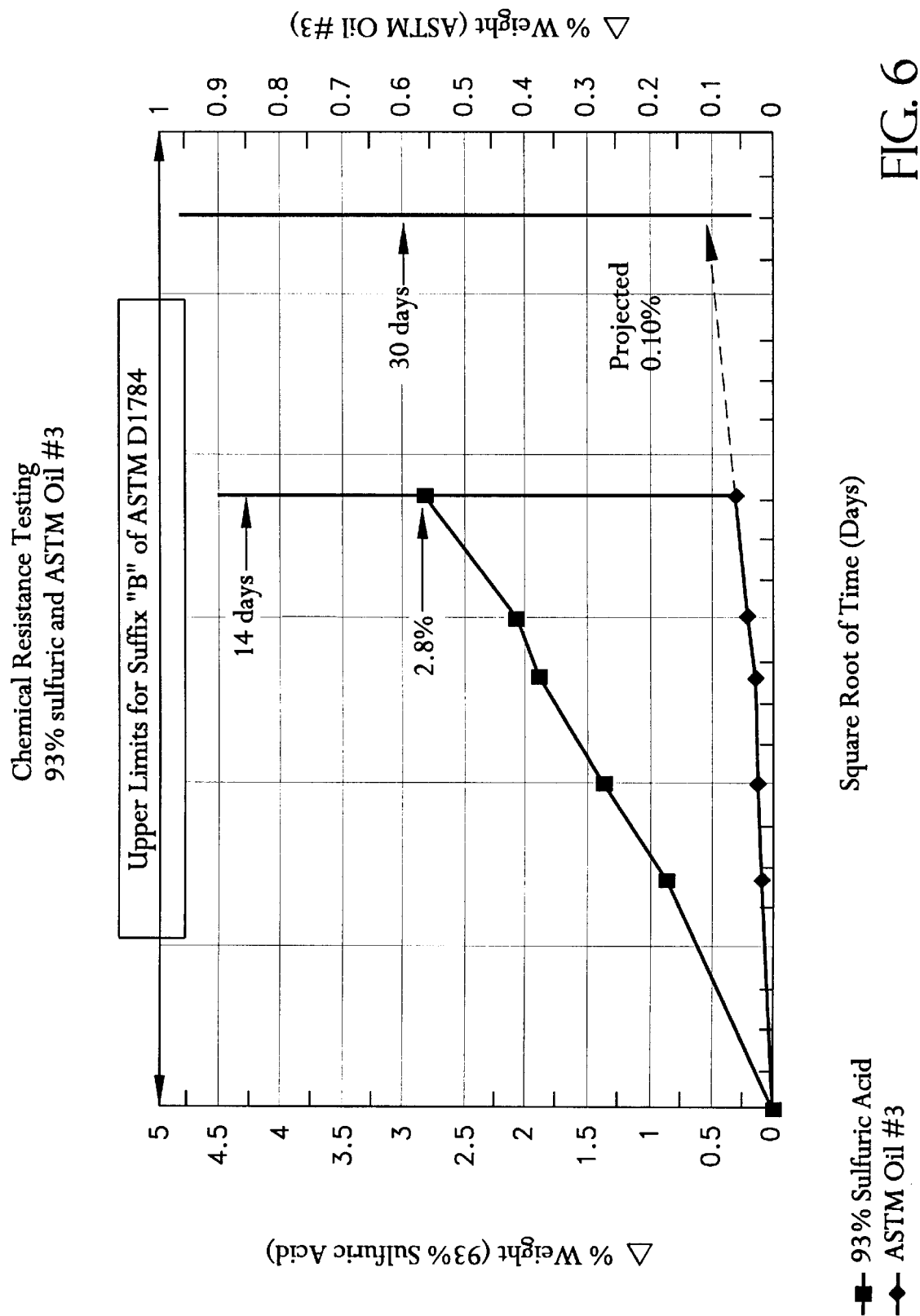
FIG. 6 graphically illustrates chemical resistance of the composition of FIG. 3 in accordance with ASTM D 1784.
Figure 7:
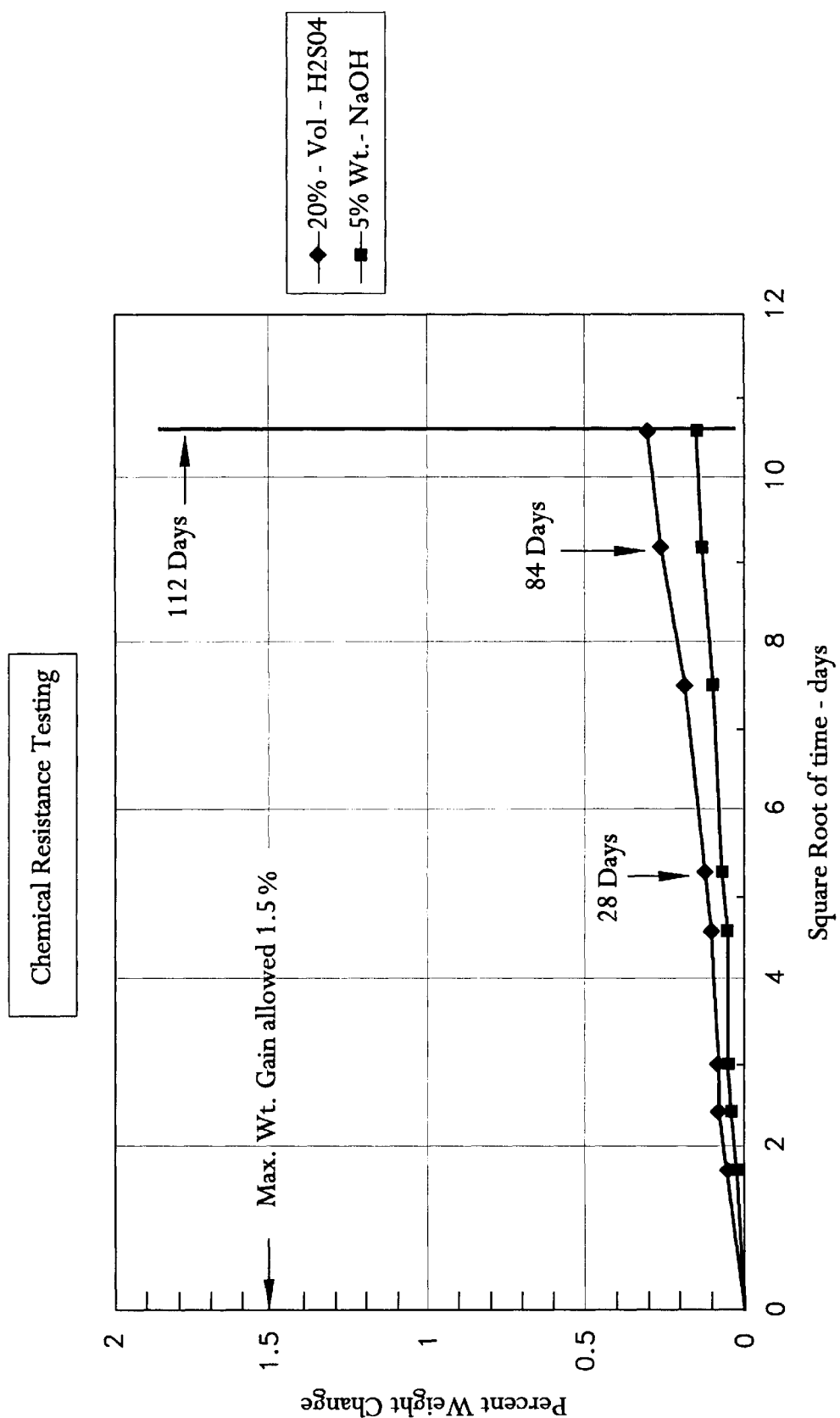
FIG. 7 further graphically illustrates chemical resistance of the composition of FIG. 3.

Various properties of the inventive PVC-based compositions are illustrated in FIGS. 3–8. Turning now to FIG. 3, heat stability of a preferred PVC-composition produced in accordance with this invention is illustrated. The makeup of the composition tested is set forth below in Table 3.

illustrate the strong chemical resistance of the example composition, particularly FIG. 6 (ASTM D 1784) showing only 2.8% resistance to $H_2SO_4$ after 14 days and 0.10% resistance to oil #3 after 30 days which are well within ASTM D 1784 category B. In FIG. 7, chemical resistance to $H_2SO_4$ and NaOH is graphically illustrated and which shows relatively minimal weight gain. Finally, in FIG. 8 classification of various properties of the inventive example composition is set forth, an categorized according to ASTM D 1784.

We claim:

1. A pipe liner made from a composition comprising PVC, a PVC-hydrogen bonding modifier and a PVC-polar bonding modifier wherein the PVC-hydrogen bonding modifier is selected from the group comprising: ethylene-methyl acrylate copolymer, ethylene-ethyl acrylate copolymer, ethylene-butyl acrylate copolymer, polyvinyl acetate, ethylene-vinyl acetate copolymer and ethylene-vinyl alcohol copolymer, and the PVC-polar bonding modifier is chlorinated polyethylene, said pipe liner having the following properties: a tensile strength of from about 5500 to about 6600 as determined by ASTM method D-638; a tensile modulus of from about 280,000 to about 360,000 psi as determined by ASTM method D-638; a specific gravity of from about 1.30 to about 1.36 as determined by ASTM method D-792; an Izod Impact of greater than about 1.50 ft. lbs./in. as determined by ASTM method D-256; a deflection temperature of from about 63° C. to about 64° C. as determined by ASTM method D-648; a thermal expansion of from about 2.7 to about $3.2 \times 10^{-5}$/°F. as determined by ASTM method E-831; an acid resistance value of B as determined by ASTM methods D-543 and D-790 and an oil resistance rating of A as determined by ASTM method D-543.

2. The pipe liner of claim 1 wherein said composition comprises PVC in an amount of 100.00 PHR, tin heat

TABLE 3

| | | | Modifiers | | |
|---|---|---|---|---|---|
| | | | 4 phr CPE | | |
| and 6 phr | | 10 phr | | | |
| | | | EBA copolymer | 10 phr | EBA copolymer |
| Material | Trade Name & Supplier | Lubricant Type | phr | phr | phr |
| PVC Pipe Grade Resin | | | 100 | 100 | 100 |
| Heat Stabilizer | (TM-697, Morton Int'l.) | | 2.5 | 2.5 | 2.5 |
| Calcium Stearate | (Extra-Dense G, Witco Corp.) | Internal Lubricant | 0.7 | 0.7 | 0.7 |
| Paraffin Wax | (Sunolite 160, Witco Corp.) | External Lubricant | 1.3 | 1.3 | 1.3 |
| Polyethylene Wax | (AC-316-A, Allied Signal) | External Lubricant | 0.3 | 0.3 | 0.3 |
| Calcium Carbonate | (M3, J.M. Huber Co.) | | 3 | 3 | 3 |
| Titanium Dioxide | (CR-834, Kerr McGee) | | 2 | 2 | 2 |
| Process aid | (K-120-ND, Rohm & Haas) | | 2 | 2 | 2 |
| Chlorinated Polyethylene | (CPE-3615, Dow Chemical) | | 4 | 10 | |
| EBA Copolymer | (Elvaloy 441-P, DuPont Corp.) | | 6 | | 10 |
| | | Total Parts | 121.8 | 121.8 | 121.8 |

Figure 4:
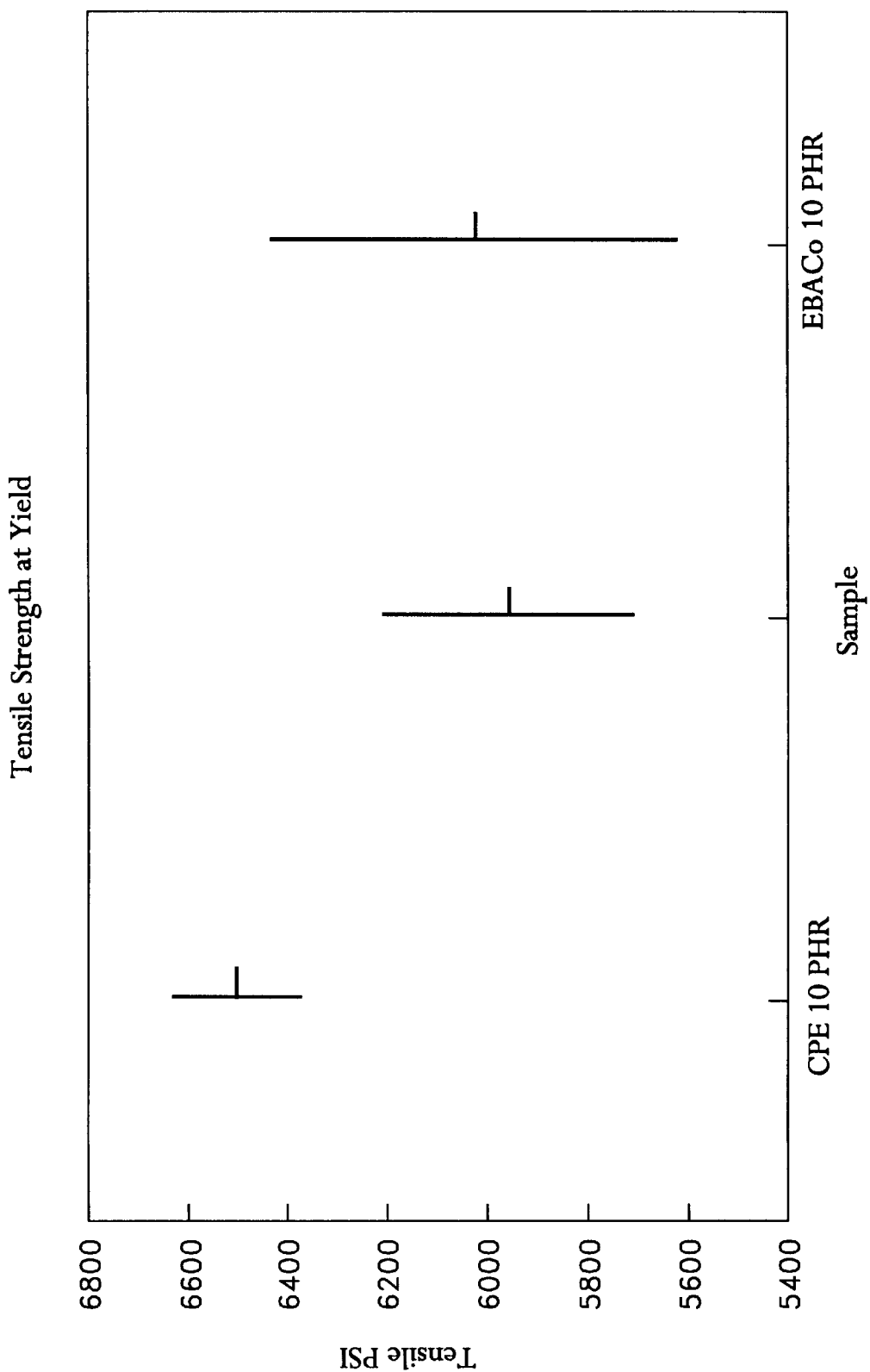
FIG. 4 graphically illustrates tensile strength at yield of the composition of FIG. 3.
Figure 5:
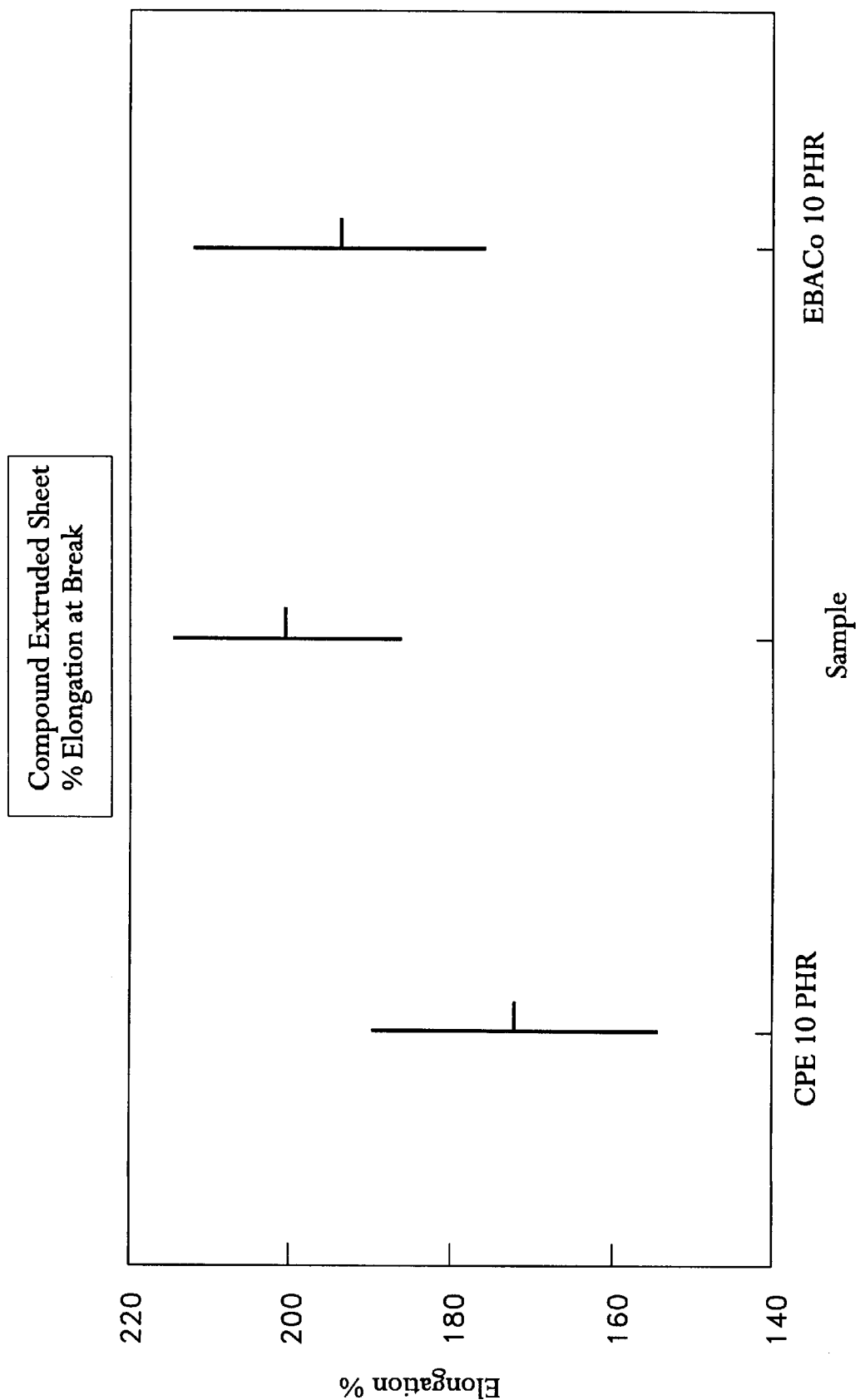
FIG. 5 graphically illustrates % elongation at break of the composition of FIG. 3.

As shown in FIG. 3, heat stability of the above-described composition increases with increasing amounts of EBA copolymer without significantly impacting fusion time. In FIG. 4 tensile strength at yield is graphically illustrated for the same example composition and shows increased stability of a blend of CPE and EBA over that of CPE alone and increased uniformity of the blend over that of EBA alone. In FIG. 5 this example composition is again tested, and illustrates the synergistic effect of the combination of hydrogen bonding modifiers and polar bonding modifiers with PVC on the increased elongation at break. Next, FIGS. 6 and 7 stabilizer in an amount of from about 0.8 to about 2.5 PHR, internal lubricant in an amount of from about 0.5 to about 1.0 PHR, external lubricant in an amount of from about 1.0 to 1.5 PHR, filer in an amount of from about 3.0 to about 5.0 PHR, $TiO_2$ in an amount of from about 1.0 to about 3.0 PHR, a processing aid in an amount of from about 1.0 to about 1.0 PHR, an impact modifier in an amount of from about 0.5 to about 15 PHR, and ethylene-alkylacrylate copolymer in an amount of from about 0.5 to about 15 PHR.

* * * * *